Patented Dec. 27, 1938

2,141,996

UNITED STATES PATENT OFFICE 2,141,996

WIRE FOR ELECTRIC WELDING

Franz Leitner, Kapfenberg, Austria

No Drawing. Application March 9, 1937, Serial No. 129,959. In Great Britain January 7, 1937

4 Claims. (Cl. 219—8)

This invention relates to welding wire which yields welded joints having high tensile strength and high endurance limit strength under repeated stress. These beneficial results are obtained by using cored wire to which is added manganese, zirconium, silicon in a very definite, narrowly limited proportion. The alloying limits of this wire are: 0.12–0.32% carbon, 0.35–1% silicon, 0.7–1.6% manganese, 0.25–0.5% zirconium. In order to attain maximum effect a cored wire is used having the following core mass: 80–95% lime, 2–15% aluminum and 3–15% manganese; the manganese may be wholly or partly replaced by aluminum, however. In the case of an unworked weld with a structural steel having a strength of 37 kg./mm.$^2$ an endurance limit strength under repeated stress was obtained amounting to 18–25 whilst in the case of a steel with a strength of 52 kg./mm.$^2$ the said endurance limit strength amounted to 20–26 kg./mm.$^2$ at a tensile strength which in all cases exceeds the strength of the basic material. Theoretically, this high endurance limit strength under repeated stress could perhaps exceptionally be attained with some expensive cased wires, although such cases are actually not yet known. Furthermore, cased rods in practice have the drawback of poor weldability in the case of overhead and vertical welding. In the case of bare wires and other cored wires, however, such high endurance limit strength at repeated stress has not yet been known. In Austrian specification No. 135,672 cored wires are described within the wide ambit of which the wires according to the present invention lie. One could not deduce from this prior specification, however, a wire with the narrow composition now disclosed for the purpose of producing high endurance limit strength under repeated stress. Furthermore, in the wire according to the present invention, the maximum effect is obtained with a very definite composition of the core material, mentioned above. Furthermore the Austrian specification referred to does not have as its object the production of wires of high endurance limit strength under repeated stress, but the production of wires having high notch stress and aging stability. In the case of basic material of high strength nickel may be added within the limits 0.4 to 1.5%, and also molybdenum in a quantity of 0.15 to 0.45%, for the purpose of improving the wire.

Having now particularly described and ascertained the nature of my said invention and in what manner the same is to be performed, I declare that what I claim is:

1. A cored wire for producing a welded joint of high endurance limit strength under repeated stresses composed of 0.12 to 0.32% carbon, 0.35 to 1% silicon, 0.7 to 1.6% manganese, 0.25 to 0.5% zirconium and the remainder iron, the core being composed of 80 to 95% lime, 2 to 15% aluminum and 3 to 15% manganese.

2. A cored wire as claimed in claim 1 wherein the manganese of the core is replaced by aluminum.

3. A cored wire as claimed in claim 1 further composed of 0.4 to 1.5% nickel.

4. A cored wire as claimed in claim 1 further composed of 0.4 to 1.5% nickel and 0.15 to 0.45 molybdenum.

FRANZ LEITNER.